(12) United States Patent
Saint-Jalmes

(10) Patent No.: US 7,377,467 B2
(45) Date of Patent: May 27, 2008

(54) AIRCRAFT LUGGAGE LOCKER

(75) Inventor: Bruno Saint-Jalmes, Toulouse (FR)

(73) Assignee: Airbus, Blagnac (FR)

( * ) Notice: Subject to any disclaimer, the term of this patent is extended or adjusted under 35 U.S.C. 154(b) by 721 days.

(21) Appl. No.: 10/449,447

(22) Filed: May 30, 2003

(65) Prior Publication Data

US 2003/0222174 A1    Dec. 4, 2003

(30) Foreign Application Priority Data

May 30, 2002    (FR) .................................. 02 06609

(51) Int. Cl.
  *B64D 11/00*    (2006.01)
(52) U.S. Cl. ................. 244/118.1; 244/118.5; 244/118.6; 244/122 R
(58) Field of Classification Search ............ 244/118.5, 244/118.1, 118.6, 122 R
See application file for complete search history.

(56) References Cited

U.S. PATENT DOCUMENTS 3,623,683 A * 11/1971 Bennett ................... 244/122 A
4,204,657 A * 5/1980 Graham ................... 244/122 R
5,108,048 A * 4/1992 Chang ..................... 244/118.1
5,934,615 A * 8/1999 Treichler et al. ......... 244/118.5

FOREIGN PATENT DOCUMENTS

DE           2034103         1/1972

* cited by examiner

*Primary Examiner*—Rick Palabrica
(74) *Attorney, Agent, or Firm*—VanOphem & VanOphem, P.C.

(57) ABSTRACT

An aircraft luggage locker is disposed in a compartment under a seat cushion which pivots about a horizontal axis. The locker includes a rack to receive luggage has a back wall from which extends a bottom wall and an opening at the end opposite the back wall. The rack is movable between a lying down position in which the back is in a generally vertical plane, the bottom wall is in a generally horizontal plane, and the opening is facing a wall of the compartment, and an inclined position in which the bottom wall is inclined to the horizontal and the opening of the rack is in a raised position relative to the back. Movement of the rack between the lying down position and the inclined position is a combination of a movement in translation in a horizontal plane and rotation about a horizontal axis perpendicular to the direction of movement in translation of the rack.

8 Claims, 2 Drawing Sheets

AIRCRAFT LUGGAGE LOCKER

CROSS-REFERENCE TO RELATED APPLICATIONS

This application claims priority to French Application No. 02 06609 filed on May 30, 2002.

BACKGROUND OF THE INVENTION

1. Field of the Invention

The present invention relates to an aircraft luggage locker.

2. Description of the Prior Art

Aircraft passengers' carry-on luggage is usually placed in an overhead luggage locker above the seats. This conventional arrangement is also encountered in other forms of transportation, for example buses and trains.

Although widely used, in an aircraft this place for luggage has a number of disadvantages. Given the shape of an aircraft cabin, whose cross section is usually the shape of a circular arc, little room is left above the heads of seated passengers. On rising, passengers must therefore take care not to bump their head against the luggage lockers.

Aircraft cabins are usually relatively low in height and providing overhead luggage lockers closed by a hinged flap makes the space inside an aircraft cabin seem cramped.

There are strict safety requirements in an aircraft. Luggage must be stowed away and there must be no risk while in flight of it escaping from its stowage. Furthermore, there are standardized luggage dimensions that must be adhered to. It is therefore necessary to provide stowage able to accommodate a standard piece of luggage. The stowage must also be easily accessible. It is also necessary to provide space for equipment such as life vests.

An object of the present invention is to provide a new aircraft luggage locker that conforms to the constraints to be complied with in this aeronautical application and frees up the space above seated passengers.

SUMMARY OF THE INVENTION

The present invention proposes an aircraft luggage locker mounted in a compartment under a seat cushion which is adapted to pivot about a horizontal axis, the locker includes a rack adapted to receive luggage of generally parallelepiped shape. The locker has a back wall from which extends a bottom wall and an opening at the end opposite the back wall. The locker further is movable between a lying down position in which the back wall is in a substantially vertical plane, the bottom wall is in a substantially horizontal plane, and the opening is facing a wall of the compartment under the seat cushion, and an inclined position in which the bottom wall is inclined toward the horizontal and the opening of the rack is in a raised or upward facing position relative to the back wall, in which movement of the rack between the lying down position stowed and the inclined position is a combination of a movement in translation in a substantially horizontal plane and rotation or pivoted about a substantially horizontal axis perpendicular to the direction of movement in translation of the rack.

The above kind of luggage locker can accommodate luggage of the passenger seated on the corresponding seat, which can be a seat for one passenger or for several passengers. The bag is placed in the rack when the latter is in its inclined position and the rack is then moved to its lying down or stowed position. Thus the bag is not merely placed in a locker provided under the seat cushion, but accommodated under the seat with the possibility of providing a gap between the seat cushion and the luggage locker. This gap can be used to stow safety equipment (for example a life vest) and to accommodate the feet of the person seated on the seat, or of another person seated behind the seat.

The combination of rotation and movement of the rack in translation between its lying down position and its inclined position means that the same size rack can accommodate a larger bag. In this embodiment the rack pivot axis for example substantially corresponds to an edge between the back wall of the rack and the bottom wall that is horizontal in the lying down position, is mobile, and tracks the movement in translation.

The seat cushion preferably pivots about a horizontal axis at a junction between the seat cushion and a back of the seat.

The pivoting of the seat cushion advantageously creates the movement of the rack. There is therefore no need to manipulate the seat cushion and the rack separately to place a bag in the luggage locker or remove it. It is sufficient to pivot the seat cushion about its pivot axis.

To re-establish a flat floor above the luggage locker, the latter has, for example, a lid which forms a floor, is adapted to pivot about one of its edges, is disposed between the rack and the seat cushion and is substantially horizontal when the rack is in the lying down position. In an embodiment resulting in a flat floor above the locker, the rack has a top wall that is substantially horizontal when the rack is in the lying down position and has a hinge axis parallel to the pivot axis of the seat cushion. In this case, it is the rack itself that forms the floor.

The present invention also provides an aircraft seat having a seat cushion and a seat back wherein the seat cushion pivots about a substantially horizontal axis and the seat incorporates a luggage locker as defined hereinabove.

The pivot axis of the seat cushion is preferably at a junction between the seat cushion and the seat back. The seat can receive one or more passengers.

In an advantageous embodiment, the seat includes a floor covering the rack of the luggage locker when the latter is in the lying down position, a lid being provided in the floor for access to the rack.

Details and advantages of the present invention will emerge more clearly from the following description with reference to the accompanying diagrammatic drawings.

DETAILED DESCRIPTION OF THE PREFERRED EMBODIMENT

Figure 1:
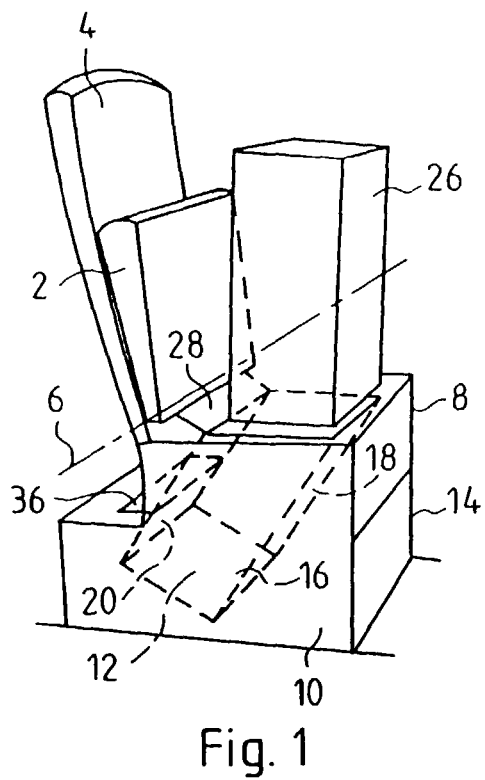
FIGS. 1 to 4 are perspective views of an aircraft seat provided with a luggage locker in accordance with the invention, showing four different positions of use.

The drawings show an aircraft seat having a seat cushion 2 and a seat back 4. For clarity, the drawings do not show any arm rests, which are optional. The seat back 4 is substantially vertical and extends upward from the seat cushion 2. The latter pivots about a horizontal axis 6 at the level of the junction between the seat back 4 and the seat cushion 2. The seat cushion 2 can therefore pivot from a substantially horizontal position (see FIGS. 4 and 8) to a substantially vertical position (see FIGS. 1 and 5), folded against the seat back 4. The seat cushion 2 and the seat back 4 are mounted on a frame 8 that is not shown in detail, for example a tubular frame, which may be fitted with a side panel 10, in particular if the seat is at the end of a row of seats.

Figure 5:
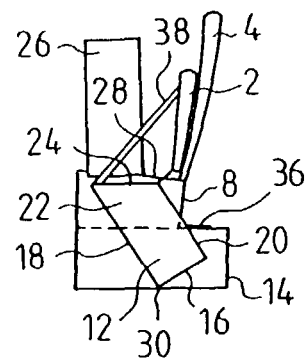
FIGS. 5 to 8 correspond to FIGS. 1 to 4, respectively, and are side views of the seat and its luggage locker to a smaller scale.

The seat shown includes a luggage locker that is accessible when the seat cushion 2 is raised, as shown in FIGS. 1 and 5. The luggage locker of the seat includes a rack 12 disposed inside a compartment 14.

The rack 12 is of globally parallelepiped shape, with one inclined end. It has a rectangular back wall 16 from which extend a bottom face or wall 18, a top face or wall 20 and two lateral faces or walls 22. The rack 12 is open at the end opposite the back wall 16. The opening 24 of the rack 12 is rectangular and is not parallel to the back wall 16, but inclined, thereby forming the inclined end of the rack 12. The inclination is such that the lateral faces 22 of the rack 12 are identical and the top face 20 is slightly smaller than the bottom face 18.

In the embodiment shown in the drawings, the faces 18, 20 and 22 of the rack 12 are solid, but it should be noted that these faces 18, 20 and 22 are not necessarily solid. The bottom face 18 and the back wall 16 are preferably solid, but it does not matter whether the other faces 20, 22 are solid or perforated. In the case of the top and lateral faces 20 and 22, structurally defining only the corresponding edges may be envisaged, for example by means of a tubular structure. It is also possible for only the back wall 16 and the bottom face 18 to be structurally defined.

The compartment 14 is elongate and also of parallelepiped shape. The bottom of the compartment 14 is preferably the floor of the aircraft cabin. The vertical lateral walls of the compartment 14 are solid, but could be at least partly perforated or of mesh construction. The top wall includes an opening allowing the movement of the rack 12.

In FIGS. 1 and 5, the rack 12 is in an inclined position ready to receive a bag 26. As shown here, the bag 26 is a standard bag corresponding to the maximum size of a bag generally accepted by airlines as carry-on luggage. The seat cushion 2 is folded back against the seat back 4. The opening 24 of the rack 12 is substantially horizontal. It is just below the bottom face of the seat cushion 2 when the latter is raised (see FIGS. 4 and 8). Raising the seat cushion 2 exposes the opening 24, which is smaller than the seat cushion 2 and substantially centered relative to the area exposed by raising the seat cushion 2.

Note that the opening has a rim 28 adjoining and substantially perpendicular to the top face 20 of the rack 12. The rim 28 serves as a stop to limit the movement of the rack 12. In the fully open position shown in FIGS. 1 and 5, the rim 28 is in contact with the seat cushion 2 substantially at the level of the horizontal axis 6. The rim 28 is also useful in preventing anything dropping between the rack 12 and the seat cushion 2 when the rack 12 is in this inclined position. A similar rim can be provided on the frame 8 to prevent anything dropping between the frame 8 and the rack 12.

In the inclined position of the rack 12, the edge 30 at the junction between the back wall 16 and the bottom face 18 rests on the bottom of the compartment 14. The lateral faces 22 are in a vertical plane. The bottom face 18 is inclined to the horizontal. The higher portion of the bottom face 18 is forward of the seat, i.e. on the side opposite the seat back 4, and the lower portion of the bottom face 18 is to the rear of the seat.

Figure 2:
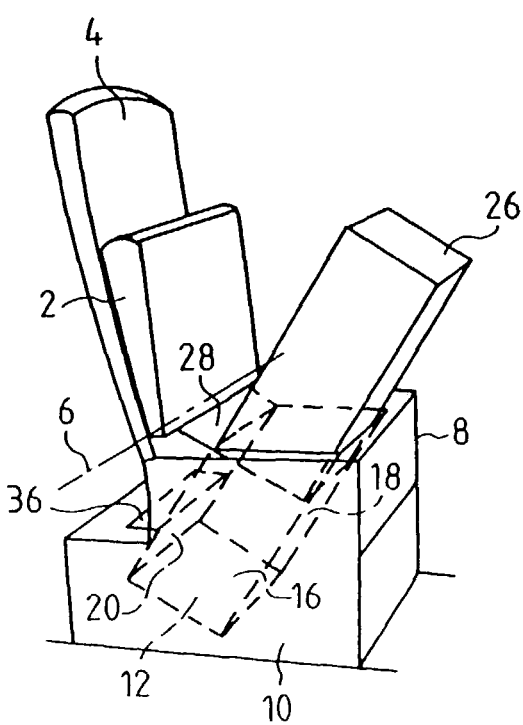
Figure 6:
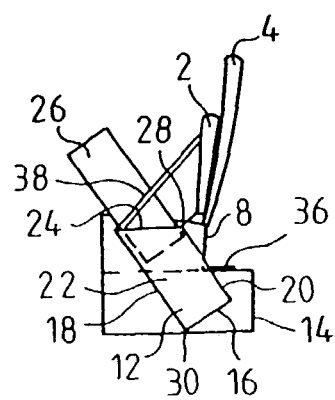

The bag 26 is inserted into the rack 12 when the latter is in the inclined position shown in FIGS. 1 and 5. It can therefore slide along the bottom face 18 like a toboggan (see FIGS. 2 and 6) until it encounters the back wall 16. In this position, it is fully inserted into the rack 12. The rack 12 can then tilt to the lying down position under the seat cushion 2.

The movement of the rack 12 shown in the drawing is a combination of a movement in a translation and a rotation. The movement in translation is horizontal and toward the rear of the seat, i.e. from the seat cushion 2 toward the seat back 4. It is symbolized in FIG. 7 by an arrow 32. The rotation is about the edge 30. It is symbolized in FIG. 7 by an arrow 34.

During this movement, the edge 30 remains in contact with the bottom of the compartment 14. For the rack 12 to slide more easily, the edge 30 can be provided with wheels or skids guided by rails. Other means can be envisaged. This combination of a movement in translation and a rotation allows a bag 26 protruding from the rack 12 to fit into the compartment 14. The rack 12 could have only a movement in rotation, but this would reduce the size of bag that could be accommodated in the compartment 14 for the same size of rack 12.

Figure 4:
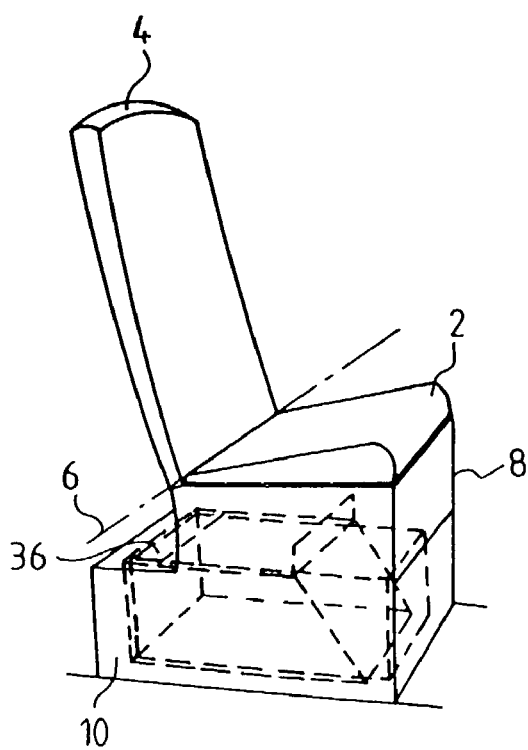
Figure 8:
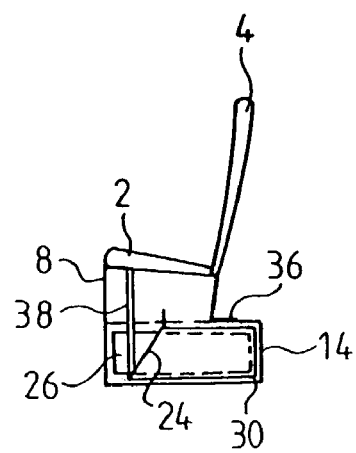

At the end of its movement, the rack 12 is lying down and is entirely inside the compartment 14. The bottom face 18 and the top face 20 are substantially horizontal and the back wall 16 is substantially vertical. The lateral walls 22 are in the same vertical plane, but have pivoted in that plane. The opening 24 is facing the front lateral wall of the compartment 14, and the bag 26 is therefore trapped in the rack 12. FIGS. 4 and 8 show this lying down position.

The compartment 14 can remain open from the rim 28 as far as the front lateral wall of the compartment 14. The passenger can then access a garment or anything else he has placed in the rack 12 without having to stand up and open the luggage locker. In this case, the rim 28 also provides a footrest for the feet of a passenger seated behind the seat, preventing that passenger from treading on items stowed in the luggage locker.

As shown in the drawing, the compartment 14 is the same width as the seat and aligned with the front of the seat. However, it protrudes to the rear of the seat and thus forms a step to the rear of the seat. This step can be used as a footrest for the passenger seated in the seat behind the seat shown. It is also possible to make a false floor at the height of the top wall of the compartment 14. The seat is then raised relative to an access aisle and a step must be provided to access the seat (or a row of seats).

Figure 3:
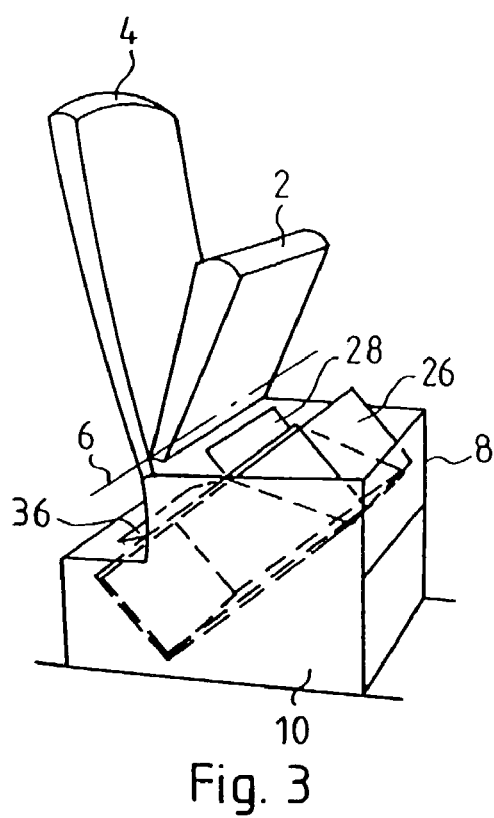
Figure 7:
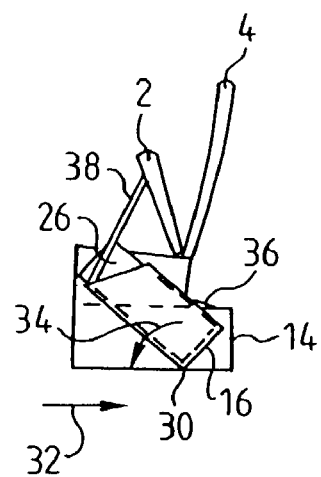

To prevent an object, a foot or a hand being trapped between the rack 12 and a wall of the compartment 14 during the movement described above, a pivoting flap 36 is provided to the rear of the seat. The pivoting flap 36 is horizontal when the rack 12 is in the lying down position (FIGS. 4 and 8) and when it is in its most inclined position (FIGS. 1 and 5). Between these extreme positions of the rack 12, the pivoting flap 36 pivots to track the movement of the rack 12, as can be seen in FIGS. 3 and 7, for example. The pivoting flap 36 has an elongate rectangular shape. One longitudinal edge pivots on the top face of the compartment 14. Its other longitudinal edge rests on the top face 20 of the rack 12.

In combination with the movement of the rack 12, the seat cushion 2 can be folded. These two movements can be independent of each other. A passenger wishing to stow a bag then raises his seat cushion 2 and pulls out the rack 12, moving it from its lying down position to its inclined position. He then inserts his bag into the rack 12, pushes the rack 12 back into its lying down position, and then lowers his seat cushion 2 in order to sit down.

The pivoting of the seat cushion 2 can be arranged advantageously to also cause the movement of the rack 12.

The passenger then has only to raise his seat cushion 2, insert his bag 26, and lower his seat cushion 2. The rack 12 simultaneously moves from its lying down position to its most inclined position and then returns to the lying down position.

To couple the movement of the rack 12 and the movement of the seat cushion 2, it is sufficient to provide at least one link connecting the seat cushion 2 to the rack 12 (preferably two such links). This link 38 is shown only in FIGS. 5 to 8. For example, a link 38 of this kind is fixed to the bottom face 18 of the rack 12 near the opening 24 and to the bottom face of the seat cushion 2, i.e. the face of the seat cushion opposite that supporting the passenger.

Relatively small objects placed in the rack 12 can be prevented from escaping from the compartment 14 in flight. For examples, if the aircraft encounters severe turbulence, a lid can be provided, positioned between the rack 12 and the seat cushion 2. The lid is not shown in the drawing. It can simply consist of a lid mounted in the same way as the pivoting flap 36 but with dimensions such that it extends just forward of the seat. The shape of the lid is such that, in the lying down position of the rack 12, the opening in the top wall of the compartment 14 is entirely covered by the lid. The compartment 14 is then entirely closed.

Another way to close the compartment 14 is to provide a top face 20 of the rack 12 whose shape corresponds to the shape of the opening in the top wall of the compartment 14. To prevent this face impeding insertion of a bag 26 into the rack 12 when the latter is in the inclined position, the top face 20 of the rack 12 can be hinged. It can be hinged at the edge between the back wall 16 and the top face 20. While a bag 26 is being inserted into the rack 12, the top face 20 and the bottom face 18 then form a dihedral that converges toward the back wall 16. The hinge, which is preferably parallel to the edge between the top face 20 and the back wall 16, can be disposed elsewhere on the top face 20, for example adjacent the opening 24.

The seat and the luggage locker according to the invention thus enable a bag 26 to be stowed under the seat of an aircraft passenger. A gap remains between the lowered seat cushion 2 and the luggage locker. The passenger seated on the seat, or a passenger behind him, also has room for their feet between their seat cushion 2 and the luggage locker. This space is also sufficient to receive safety equipment such as a life vest.

If a plurality of seats are arranged in a row, the solutions described above for stowing luggage can accommodate a greater volume of luggage than prior art overhead luggage lockers above the seats. One locker can be provided for each seat in the row, or there can be one locker common to several seats, to increase the storage space.

Passengers have more room above their heads and are therefore less likely to bang their heads on standing up. This also produces a large volume within the aircraft, giving the impression that the ceiling is higher.

The present invention is not limited to the embodiments described above and shown in the drawings. It also includes all variants within the scope of the following claims that the person skilled in the art might envisage.

The invention claimed is:

1. An aircraft luggage locker compartment disposed under a seat having a seat cushion adapted to pivot about a horizontal axis, said aircraft luggage locker compartment comprising:

a housing comprising a frame structure having opposing side panels, a front panel therebetween and a top panel having an opening therein, said housing being complimentary with said seat;

a rack mounted in said frame structure, said rack comprising:

a back wall;

opposed sidewalls attached to said back wall;

a bottom wall disposed between said opposed sidewalls and attached to said back wall; and an opening at an end opposite said back wall; and means for pivoting and simultaneously translating said rack within said frame structure between a first lying down position in which said back wall extends in an upward direction, said bottom wall is transverse to said back wall, and said opening is facing said front panel of said frame structure, and a second inclined upright position in which said bottom wall is inclined in a direction toward the horizontal and said opening of said rack is in an inclined upright position aligned with said opening in said top panel of said framed structure, whereby luggage may be placed through said opening in said top panel of said frame structure and said opening in said end opposite to said back wall of said rack into said rack by an airline passenger when said rack is in said second inclined upright position and thereafter said rack may be pivoted and translated to said first lying down position whereby said luggage faces said front panel of said frame structure such that said luggage cannot slide forward out of said rack while said passenger is in said aircraft.

2. The aircraft luggage locker compartment as claimed in claim 1 wherein said means for pivoting and simultaneously translating said rack further comprises a rack pivot axis and wherein said rack pivot axis substantially corresponds to an edge between said back of said rack and said bottom wall of said rack that is horizontal in said lying down position, said edge being mobile and tracking said movement in translation.

3. The aircraft luggage locker compartment as claimed in claim 1 further comprising a horizontal axis at a junction between said seat cushion and a seat back about which said seat cushion pivots.

4. The aircraft luggage locker compartment as claimed in claim 1 further comprising means for attaching said seat cushion to said rack such that said pivoting of said seat cushion in one direction causes said rack to move from said first lying down position to said second inclined position and in an opposite direction from said second inclined position to said first lying down position.

5. The aircraft luggage locker compartment as claimed in claim 1, further comprising a lid which forms a cover member, said cover member further having means for pivoting integral with one of its edges to pivot about said one of its edges, said cover member further disposed between said rack and said seat cushion and is disposed substantially horizontal when said rack is in said lying down position.

6. The aircraft luggage locker compartment as claimed in claim 1 wherein said rack has a top wall that is substantially horizontal when said rack is in said lying down position, and wherein said pivoting and translating means further comprises a hinge axis parallel to said pivot axis of said seat cushion.

7. An aircraft seat comprising a seat cushion and a seat back wherein said seat cushion pivots about a substantially horizontal axis and said seat incorporates a luggage locker compartment as claimed in claim 1.

8. The aircraft seat claimed in claim 7 wherein said pivot axis of said seat cushion is at a junction between said seat cushion and said seat back.

* * * * *